Figure 1:
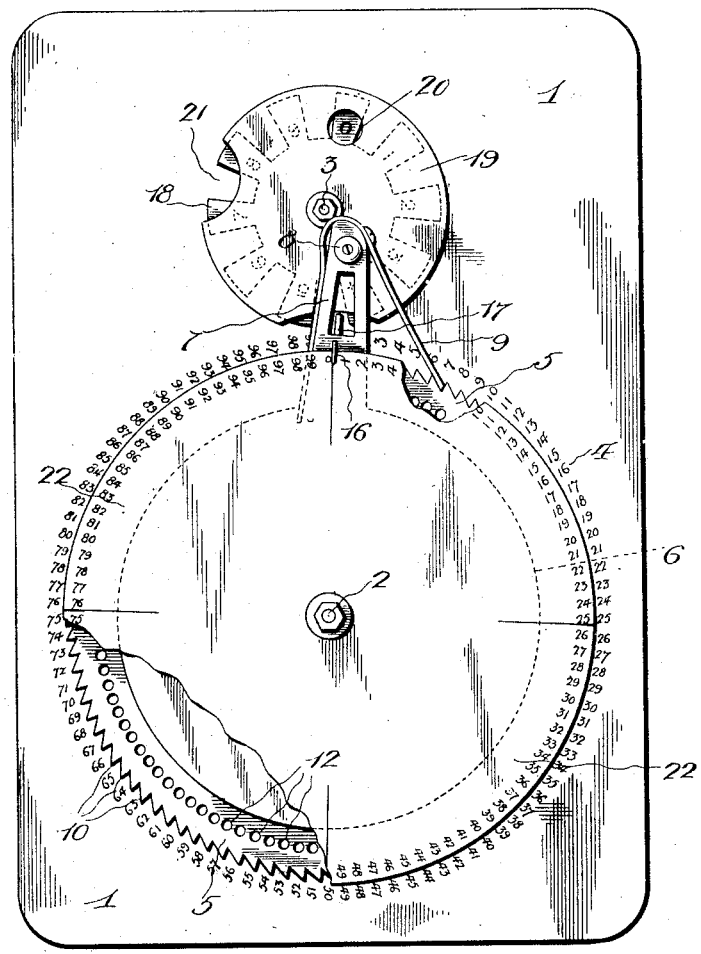

No. 630,904. Patented Aug. 15, 1899.
J. Q. LONG.
ADDING MACHINE.
(Application filed June 9, 1899.)

(No Model.)

Witnesses

Inventor
John Q. Long,
by H. B. Willson & Co.
Attorneys

UNITED STATES PATENT OFFICE.

JOHN Q. LONG, OF COLFAX, LOUISIANA.

ADDING-MACHINE.

SPECIFICATION forming part of Letters Patent No. 630,904, dated August 15, 1899.

Application filed June 9, 1899. Serial No. 719,874. (No model.)

*To all whom it may concern:*

Be it known that I, JOHN Q. LONG, a citizen of the United States, residing at Colfax, in the parish of Grant and State of Louisiana, have invented certain new and useful Improvements in Adding-Machines; and I do declare the following to be a full, clear, and exact description of the invention, such as will enable others skilled in the art to which it appertains to make and use the same.

My invention relates to adding-machines; and the object is to provide a simple, inexpensive, and accurate device of this character.

To this end the invention consists in certain features of construction and combination of parts, which will be hereinafter more fully described and claimed.

In the accompanying drawings the same reference characters indicate the same parts of the invention.

Figure 2:
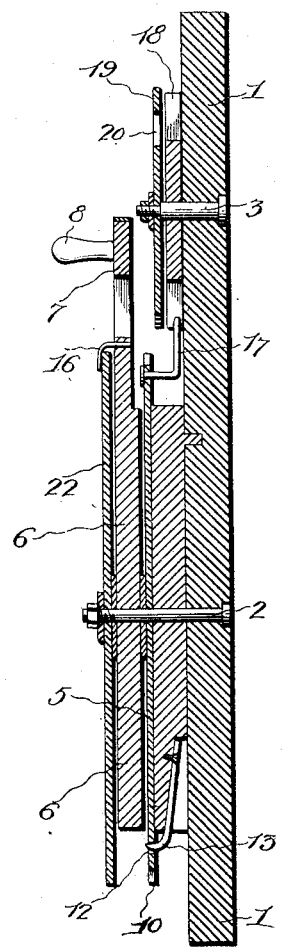

Figure 1 is a top plan view of my improved adding-machine, and Fig. 2 is a longitudinal section of the same.

In the drawings, 1 denotes the base-board, in which the vertical stud-posts 2 and 3 are fixed, and 4 denotes a scale formed on the board concentric with the post 2 and containing the figures from "0" to "99," arranged in regular order and at regular intervals.

5 denotes the computing-wheel, which is mounted on the stud-post 2, and its periphery is provided with one hundred teeth to correspond to the division on the annular scale 4. 6 denotes a disk, also mounted on the stud-post above the computing-wheel, and it is provided with a radial arm 7, carrying a vertical knob or handle 8, by means of which the machine is manipulated, and 9 denotes a spring-pawl carried by the arm 7 and engaging the teeth 10 on the wheel 5.

12 denotes a series of orifices formed in the wheel 5 and corresponding to the number of teeth, and 13 denotes a retaining-spring fixed to the base-board, and its toe 14 projects into said orifices to prevent backward movement of the computing-wheel when the arm 7 is restored to its unison point.

16 denotes a pointer carried by the arm 7 and which traverses the figure-scale to indicate the figure at which it is desired to stop.

17 denotes a radial arm carried by the computing-wheel and projecting into the path of the leaf-disk 18, containing ten leaves, on which the ten digits appear in regular order, the two wheels being so arranged with relation to each other that one complete revolution of the "units-wheel" 5 will rotate the "hundreds-wheel" one-tenth of a revolution or a distance equivalent to one leaf.

19 denotes the cover of the wheel 18, which is provided with a window 20, through which the proper numeral is presented to view and read off, and with a marginal recess 21, through which the thumb or finger may be inserted to restore the wheel to unison.

A reading-dial 22 is fixed on the stud-post 2, so as to remain stationary, and in adding up a column of figures it is only necessary to bring the arm 7 around to the right until the pointer 16 is alined with the figures on the stationary dial 22 corresponding to the sum it is desired to add.

In operating the machine to add up a column of figures—say twenty-five, fifty, and seventy-five—the two counting-wheels are first brought to unison, and by means of the handle 8 the disk 6 is moved to the right until its pointer 16 registers with the numerals "25" on the face of the disk 22. This operation through the medium of the pawl 9 also carries the disk 5 around until its arm 17 registers with the numerals "25" on the scale 4. The disk 6 is now restored to zero and again moved to the right until its pointer 16 registers with the numerals "50" on the disk 22. In the meantime the pawl 9 has moved the disk 5 forward, and its arm 17 now registers with the numerals "75" on the scale 4. The disk 6 is again restored to zero, leaving the arm 17 at its registering-point "75," and the pointer 16 is carried around to register with the numerals "75." At the same time the disk 5 and its arm 17 are moved forward seventy-five points, and as the disk passes the hundred mark on the scale 4 it turns the disk 18 one point, causing the number "1" to appear at the visual opening 20, the arm 17 then continuing its forward movement until it arrives at the numerals "50." The sum of the amounts twenty-five, fifty, and seventy-five, which have been added together, is then read off by taking the exposed number "1" on the disk 18 and the sum on the scale 4, which is indicated by the arm 17 and which in this instance is "50," making the total amount "150." The disks 5, 6, and 18 are then restored to their normal positions, and the machine is ready for the next operation.

It will of course be understood that various changes in the form, proportion, and the minor details of construction may be resorted to without departing from the principle or sacrificing any of the advantages of this invention.

Having thus fully described my invention, what I claim as new and useful, and desire to secure by Letters Patent of the United States, is—

An adding-machine, comprising the base-board 1, the posts 2, and 3, spring 13, and the annular scale 4 fixed thereon; in combination with the computing-wheel, formed with one hundred ratchet-shaped teeth and a corresponding series of retaining-orifices, the latter engaging the spring 13, the disk 6 provided with the radial arm 7, spring-pawl 9 and pointer 16, the arm 17 fixed to said wheel, the leaf-disk 18 containing ten leaves upon which the ten digits appear in regular order, and the cover 19 provided with the window 20 and thumb-recess 21, substantially as and for the purpose set forth.

In testimony whereof I have hereunto set my hand in presence of two subscribing witnesses.

JOHN Q. LONG.

Witnesses:
W. L. SHACKELFORD,
R. W. RICHARDSON.